United States Patent [19]

Wood

[11] Patent Number: 4,545,513

[45] Date of Patent: Oct. 8, 1985

[54] METERING DEVICE

[75] Inventor: Edgar A. Wood, Andrews, N.C.

[73] Assignee: Union Carbide Corporation, Danbury, Conn.

[21] Appl. No.: 609,509

[22] Filed: May 7, 1984

[51] Int. Cl.⁴ ............................................. G01F 11/24
[52] U.S. Cl. .................................... 222/632; 222/288; 222/362
[58] Field of Search .................. 222/362, 630–633, 222/636, 345, 288, 361; 406/66, 70

[56] References Cited

U.S. PATENT DOCUMENTS

| | | | |
|---|---|---|---|
| 1,361,293 | 12/1920 | Talbert et al. | 222/633 |
| 1,519,199 | 12/1924 | Green | 222/633 |
| 1,849,615 | 3/1932 | Donegan et al. | 222/633 |
| 2,179,580 | 11/1939 | Santarelli et al. | 222/632 |
| 2,314,031 | 3/1943 | Colburn | 222/636 |
| 2,446,582 | 8/1948 | Gopnet | 222/362 |
| 4,169,419 | 10/1979 | Burgess | 222/288 |

Primary Examiner—H. Grant Skaggs
Attorney, Agent, or Firm—Clement J. Vicari

[57] ABSTRACT

A metering device which is particularly suitable for distributing in measured amounts, granular materials such as granular pesticidal materials. The metering device oscillates synchronously with the operation of an air supplying bellows such that metered amounts of granular material are discharged into a chamber and the air supplied by the bellow assists the granular material in being discharged through an outlet in the chamber.

7 Claims, 4 Drawing Figures 4,545,513

METERING DEVICE

BACKGROUND OF THE INVENTION

1. Field of the Invention

The present invention relates to a metering device. In a particular aspect, the invention relates to a metering device which is particularly suitable for distributing, in measured amounts, granular materials such as granular pesticidal materials.

2. Description of the Prior Art

Pesticidal materials can be applied in various forms such as in powder or granular form. Generally, when applying pesticidal materials in powder form, the application is usually performed from a "backpack" applicator. An example of such an applicator is one which is obtainable from F. Giacomo and Luigi Carpi, 42028 Poviglio Reggio E. Italy under the tradename "SPEE-DAIR CIDUE". This type applicator is normally provided with a housing and two superimposed plates that are disposed within the housing. Each of the plates are provided with openings which are adapted to be in position depending on the position of an operating handle ranging from partial to full registry, i.e., adjustable with respect to each other whereby powdered material, introduced into the housing is permitted to fall by gravity, through each respective opening to the bottom of the housing. Air from a separate air bellows directs the material out of the unit via a flexible tube to the treatment site. Unfortunately however, there is in effect no actual metering of the material with this type of device. Moreover, this type device is not entirely satisfactory when attempting to distribute granular materials.

In short, the disadvantages of this type of device include inconsistent dosages; the inability to stop the material flow unless the operating handle is in a certain position and finally the insensitive adjustment of calibration rates.

SUMMARY OF THE INVENTION

1. Objects of the Invention

An object of the invention is to provide a positive displacement measuring device with a positive shut-off i.e., the flow of granules is impeded when the device stops in any position.

Another object is to provide an accurate metering device having little or substantially no variation between doses.

A further object is to provide a metering device wherein material can be metered at both the up and down strokes of the applicator handle.

A further object is to provide a metering device which includes an air conveying system that permits transport of the material from the metering device to the target.

2. Brief Summary of the Invention

Broadly contemplated, the present invention provides a metering device comprising a housing having a top portion and a bottom portion, a material conveying chamber disposed in said bottom portion, said chamber having an air inlet and a chamber outlet for discharging air and material from said chamber, a metering disk disposed in said top portion and being adapted to oscillate in clockwise and counterclockwise direction said disk defining a first system of four openings extending therethrough and being distributed across the surface of said disk, a top plate superimposed over said metering disk said top plate defining a second system of four openings extending therethrough and being distributed across the surface of said top plate, a hopper for feeding material to said opening in said top plate, air supply means for directing air into said air inlet and through said chamber, oscillating means operatively associated with said air supply means and said disk and adapted to oscillate said disk such that when two openings of said disk are in registering relation with two openings in said top plate for filling with material from said hopper, the other two openings in said disk discharge material to said chamber, said oscillating means being adapted to synchronously rotate said disk for discharging material to said chamber while activating said air supply means to supply air to said chamber to discharge said material through said chamber outlet.

DESCRIPTION OF THE PREFERRED EMBODIMENTS

Figure 2:
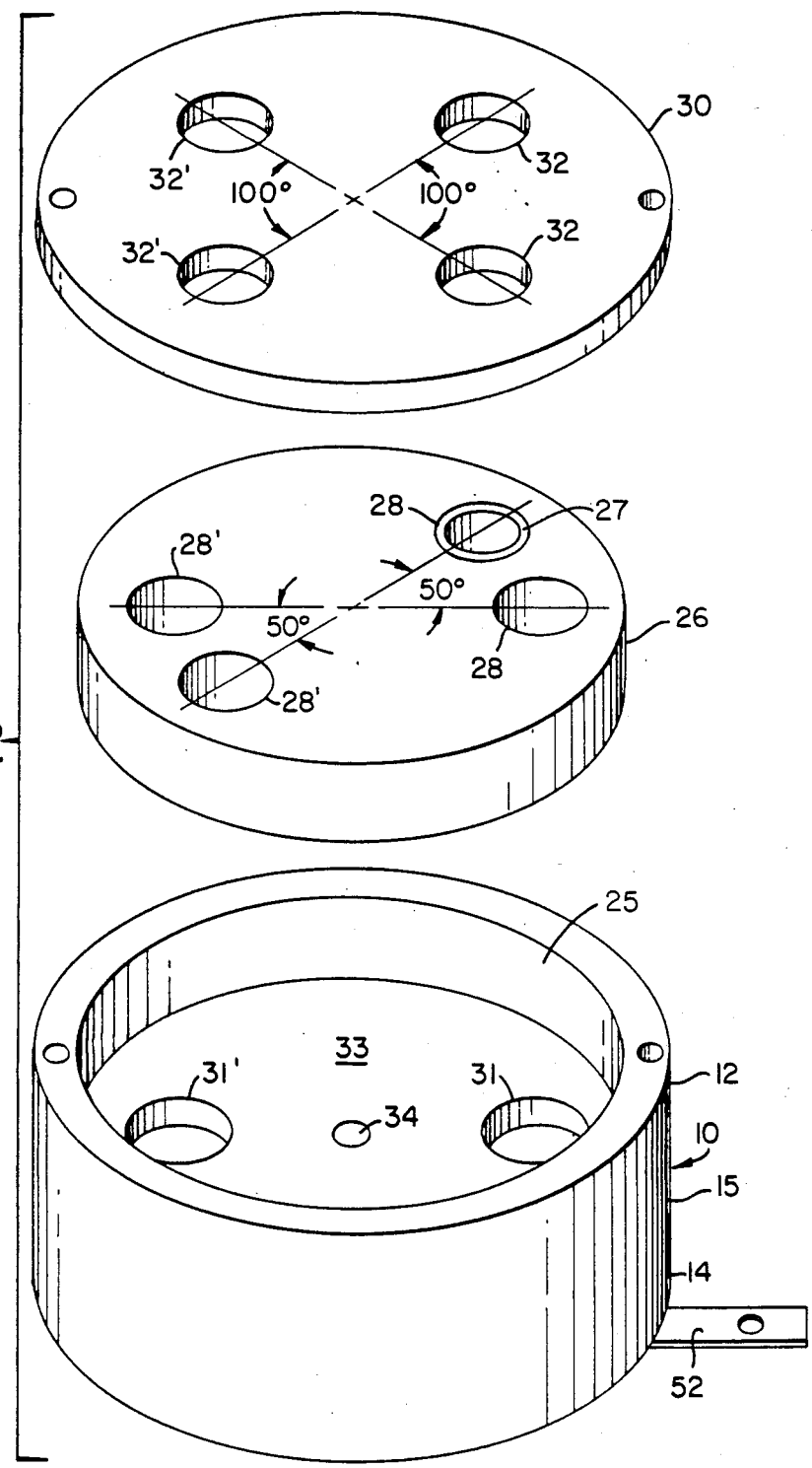
FIG 2 is an exploded view of the metering device.
Figure 4:
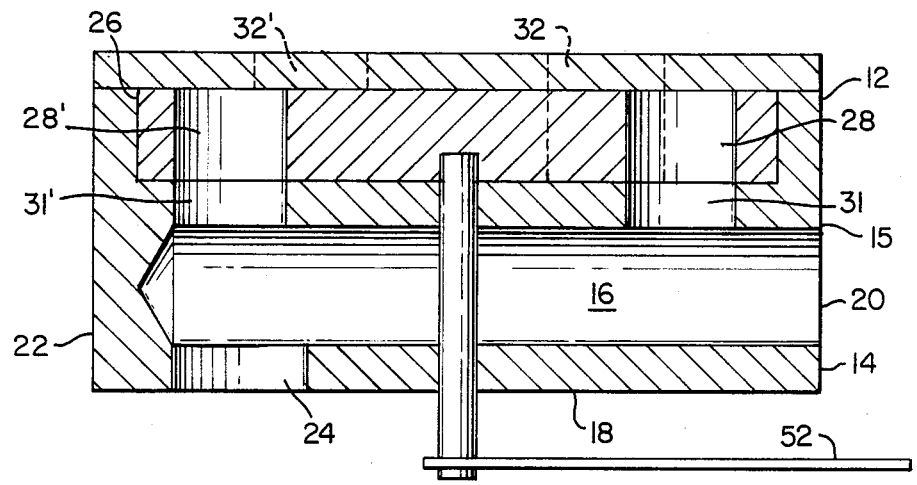
FIG. 4 is a side elevation in cross section.

With reference to the drawing and particularly FIG. 2 the metering device includes a housing 10 of a generally cylindrical configuration having a top portion 12 and a bottom portion 14 and a middle portion 15 separating the top portion from the bottom portion. As best seen in FIG. 4, in the bottom portion of the housing is a material conveying chamber 16, which extends transversely through the housing substantially parallel to the bottom surface 18 of the housing, with one end forming inlet 20 and the other end of which terminates at a point prior to the outer side wall surface 22 of housing 10.

Chamber 16 is associated with chamber outlet 24 which can be formed by drilling a hole through the bottom surface 18 substantially perpendicular to bottom surface 18.

Figure 3:
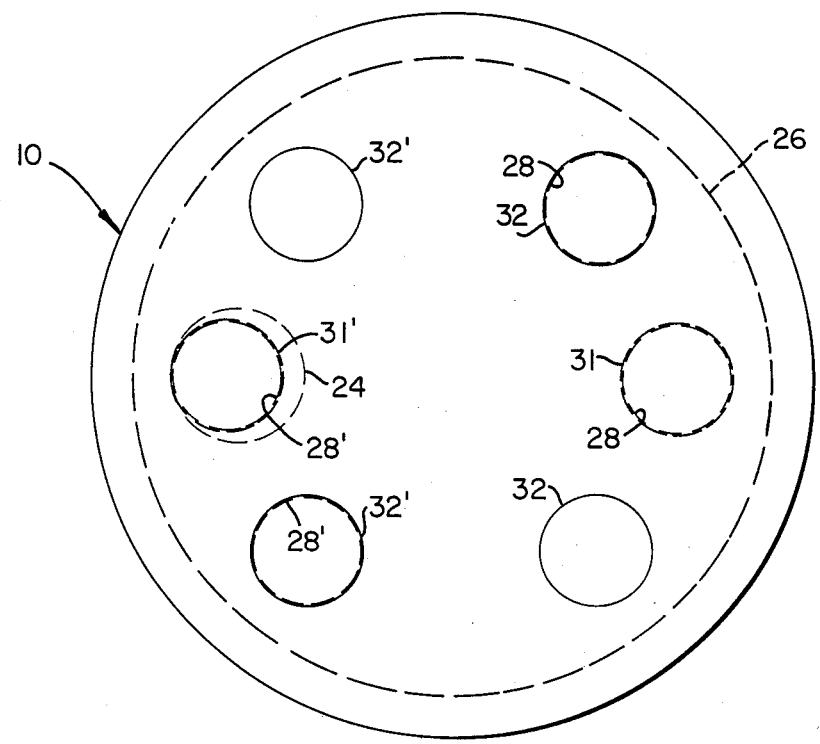
FIG. 3 is a partial plan view of the metering device partly in section.

In the top portion 12 of housing 10 is a cut-out portion or cavity 25. A metering disk 26 also of substantially cylindrical configuration is positioned within cavity 25 and is of slightly less diameter than the outer diameter of housing 10. The metering disk is provided with four openings 28 and 28' which vertically extend through disk 26 and which are distributed across the top surface of the disk. As best seen from FIGS. 2, 3, and 4 the openings can be substantially circular openings and are dispersed so that openings 28 are disposed so that they form an angle of about 50° taken from the center of disk 26 to the center of openings 28. In other words the openings closest to each other form the required angle of about 50°. In like manner, openings 28' are disposed so as to form an angle of about 50° when taken from the center of disk 26 to the center of openings 28'. The center of the openings are disposed so as to form the corners of a rectangle on which a line drawn from the center of openings 28 form one side of the width of the rectangle and the center openings 28' form the other side of the width. Lines drawn from the centers of openings 28 to 28' would form the lengths of the rectangle.

Referring again to FIG. 2 of the drawing, it will be seen that a top plate 30 is superimposed over metering disk 26 and is detachably secured such as by threaded elements and the like to the upper surface of top portion 12 of housing 10. The top plate 30 is also provided with a second system of openings 32 and 32' for the device. These openings vertically extend through top plate 30 and are distributed across the top surface of the disk. As best seen from FIGS. 2, 3 and 4 the openings can also be substantially circular. The openings are dispersed so that openings in top plate 30 are disposed so that they form an angle of about 100° taken from the center of top plate 30 to the center of openings 32. In like manner, openings 32' are disposed so as to form an angle of about 100° when taken from the center of the top plate 30 to the center of openings 32'. The center of the openings are disposed so as to form the corners of a rectangle on which a line drawn from the center of openings 32 form one side of the width of the rectangle and the center openings 32' form the other side of the width. Lines drawn from the center of openings 32 to 32' would form the lengths of the rectangle.

The relationship of the openings 32, 32' in top plate 30 to the openings 28, 28' of metering disk 26 are such that when metering disk 26 is oscillated within the housing two openings e.g., 28 and 28' are in alignment with two holes in the top plate 32 and 32' and thus open to the top of the housing for filling with material while the other two holes are not in alignment with the two remaining holes of the top plate. When two holes in disk 26 are open to the top of the housing, the two remaining holes of the disk are in registering relation to openings 31 and 31' of member 33 in middle portion 15 and thus are open to the bottom cavity for emptying.

Figure 1:
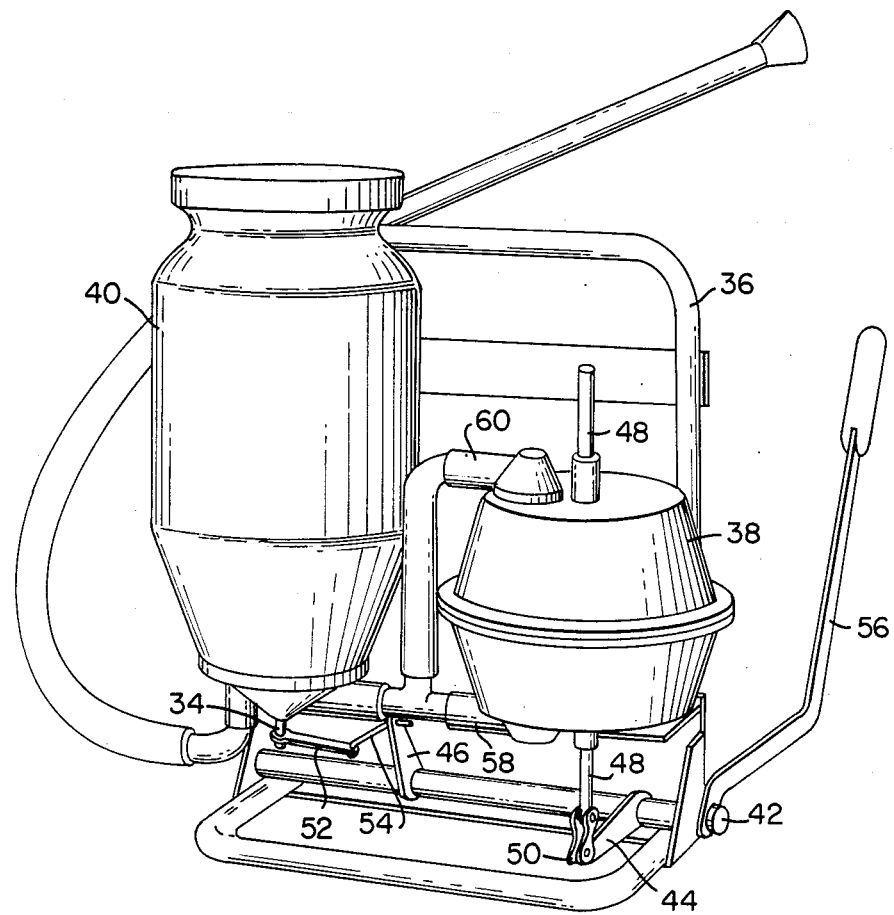
FIG. 1 is a view showing the metering device in its environment i.e. associated with a hopper and an air bellows.

Provision for oscillating the metering disk is made by axle 34 which is disposed perpendicular to the disk and extends through the bottom of the housing. The axle is connected through a linkage system to an existing lever on an applicator handle. Thus referring to FIG. 1 the entire assembly is mounted on frame 36 which supports air bellows 38 and hopper 40. Shaft 42 is rotatably mounted on frame 36 and is dispersed beneath air bellows 38 and hopper 40. Angularly projecting from shaft 42 and rigidly mounted thereto are projections 44 and 46. Projection 44 is associated with the end of member 48 through flexible linkage 50 and projection 46 is associated with axle 34 through linkages 52 and 54. Disposed on one end of shaft 42 is an applicator handle 56 which is adapted to be moved back and forth a critical distance which is turn rotates shaft 42 together with projections 44 and 46. Upward movement of handle 56 causes depression of member 48 which activates a diaphragm (not shown) in bellows 38. This causes a flow of air through conduit 58 which is connected to air inlet 20 of the metering device. Movement of handle 56 also concommitantly causes rotation of metering disk 26 through projection 46 and linkages 52 and 54 which act on axle 34 to line up the openings as explained previously. Partial rotation of handle 56 in the other opposite direction causes member 48 to assume an upward stroke which activated a diaphragm (also not shown) causing a flow of air through conduit 60 which leads to air inlet 20 of the metering of device.

As will be recognized, the distance which applicator handle 56 travels is synchronized so as to impact the desired rotation of shaft 42 which would cause the synchronized rotation of metering disk 26. Normally, this can be accomplished by angularly arranging projections 44 and 46 and adjusting the linkage 52 and 54 which would permit the desired rotation to the metering disk.

It will be further recognized that the openings in the metering disk can be of varying diameter so as to meter varying quantities of the material. The diameter of openings 28 and 28' of metering disk 26 can be varied by utilizing inserts 27 which can be inserted into openings which would decrease the diameter of the resultant openings.

In a typical mode of operation and with reference to the drawing, the applicator handle 56 is moved at start up from one position to another position. This causes rotation of shaft 42 which causes depression of member 48 and projections 44 and 46. By this action, metering disk 26 is rotated so that two openings of the disk are in registering relation with two openings in top plate 30. Material from the hopper enters these openings while the other two openings of the metering disk are now aligned with openings 31 to 31' leading to material conveying chamber 16. If any material is contained in openings registering with openings 31 and 31', then the material falls by gravity into material conveying chamber 16. Movement of handle 56 also concomitantly causes air bellows 38 to force air into material conveying chamber 16 by operation of projection 44, flexible linkage 50, member 48, causing air to flow through conduit 58 associated with air inlet 20. When the position of applicator handle 56 is reversed, this action causes limited rotation of disk 26 in opposite direction so that the openings in disk 26 formerly registering with openings 31 and 31' are now in registering relation with the other two openings in top plate 30 for material feed, whereas the openings in disk 26 formerly registering with openings in top 30 are now in position over openings 31 and 31'. As a result, material is discharged into material conveying chamber 16 and meets air entering air inlet 20 from conduit 60 resulting from the upward thrust of member 48 acting on the diaphram in the bellows.

As will be discerned from the foregoing description of the invention, there are many special features and advantages of the metering device which provide superior operation when compared with prior art devices. For example, the device provides positive shut off, i.e., the flow of material is impeded when the mechanism stops in any position. The device is accurate with little variation between doses. The dosages can be changed with different metering disks or inserts. In addition, the material can be metered at both the up and down strokes of the applicator handle. Advantageously the metering device which includes the air conveying system permits transport of the material from the metering device to the target.

Likewise, from the above it will be obvious that while the present inention has been set forth is some detail and described with particularity, it is susceptible to changes, modifications and alterations without departing from the scope and spirit of the invention.

What is claimed is:

1. A metering device comprising a housing having a top portion and a bottom portion, a material conveying chamber disposed in said bottom portion, said chamber having an air inlet and a chamber outlet for discharging air and material from said chamber, a metering disk disposed in said top portion and being adapted to oscillate in clockwise and counter clockwise direction said disk defining a first system of four openings extending therethrough and being distributed across the surface of said disk, a top plate superimposed over said metering disk said top plate defining a second system of four openings extending therethrough and being distributed across the surface of said top plate, a hopper for feeding material to said openings in said top plate, air supply means for directing air into said air inlet, and through said chamber, oscillating means operatively associated with said air supply means and said disk and adapted to oscillate said disk such that when two openings of said disk are in registering relation with two openings in said top plate for filling with material from said hopper, the other two openings in said disk discharge material to said chamber, said oscillating means being adapted to synchronously rotate said disk for discharging material to said chamber while activating said air supply means to supply air to said chamber to discharge said material through said chamber outlet.

2. A metering device according to claim 1 wherein said openings in said metering disk are substantially circular openings and are disposed so that openings closest to each other form an angle of about 50° as measured from the center of said disk to the center of each opening.

3. A metering device according to claim 1 wherein said openings in said top plate are substantially circular openings and are disposed so that openings closest to each other form an angle of about 100° as measured from the center of said top plate to the center of each opening.

4. A device according to claim 1 wherein said oscillating means include an axle attached and disposed perpendicular to said disk, a frame, a shaft rotatably mounted on said frame including angularly disposed projections, one of said projections being operatively associated with said axle while the other of said projection is operatively associated with said air supply means, and an applicator handle associated with said shaft adapted to be oscillated back and forth a critical distance thereby turning said shaft to synchronize movement of said disk with activation of said air supply means.

5. A device according to claim 1 including inserts detachably secured to said disk and defining openings of varying diameter.

6. A metering device comprising a housing having a top portion and a bottom portion, a material conveying chamber disposed in said bottom portion, said chamber having an air inlet and a chamber outlet for discharging air and material from said chamber, a metering disk disposed in said top portion and being adapted to oscillate in clockwise and counter clockwise direction said disk defining a first system of four openings extending therethrough and being distributed across the surface of said disk, said openings being substantially circular openings and being disposed so that openings closest to each other form an angle of about 50° as measured from the center of said disk to the center of said openings, a top plate superimposed over said metering disk said top plate defining a second system of four openings extending therethrough and being distributed across the surface of said top plate, said openings being substantially circular openings and being disposed so that openings closest to each other form an angle of about 100° as measured from the center of said top plate to the center of each opening, a hopper for feeding material to said openings in said top plate, air supply means for directing air into said air inlet, and through said chamber, oscillating means operatively associated with said air supply means and said disk and adapted to oscillate said disk such that when two openings of said disk are in registering relation with two openings in said top plate for filling with material from said hopper, the other two openings in said disk discharge material to said chamber, said oscillating means being adapted to synchronously rotate said disk for discharging material to said chamber while activating said air supply means to supply air to said chamber to discharge said material through said chamber outlet.

7. A device according to claim 6 wherein said osciallating means include an axle attached and disposed perpendicular to said disk, a frame, a shaft rotatably mounted on said frame including angularly disposed projections, one of said projections being operatively associated with said axle while the other of said projections is operatively associated with said air supply means, and an applicator handle associated with said shaft adapted to be oscillated back and forth a critical distance thereby turning said shaft to synchronize movement of said disk with activation of said air supply means.

* * * * *